3,023,204
VIRIDOGRISEIN, AND ITS FERMENTATIVE PRODUCTION WITH GRISEOVIRIDIN
Quentin R. Bartz, Detroit, John Ehrlich, Grosse Pointe Park, Mildred Penner Knudsen, Birmingham, and Robert M. Smith, Kalamazoo, Mich., assignors to Parke, Davis & Company, Detroit, Mich., a corporation of Michigan
Filed May 7, 1956, Ser. No. 583,219
6 Claims. (Cl. 260—112)

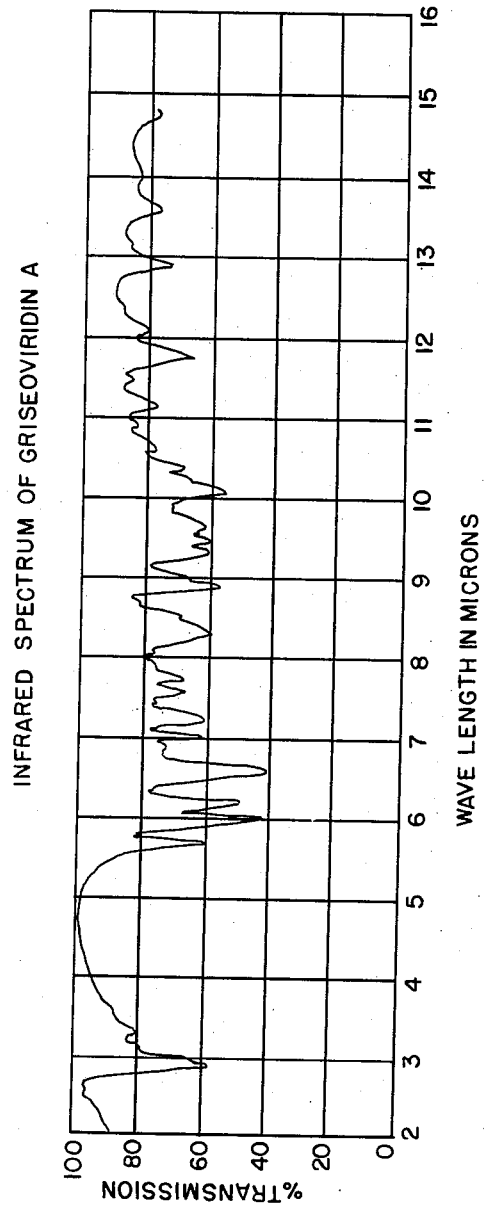

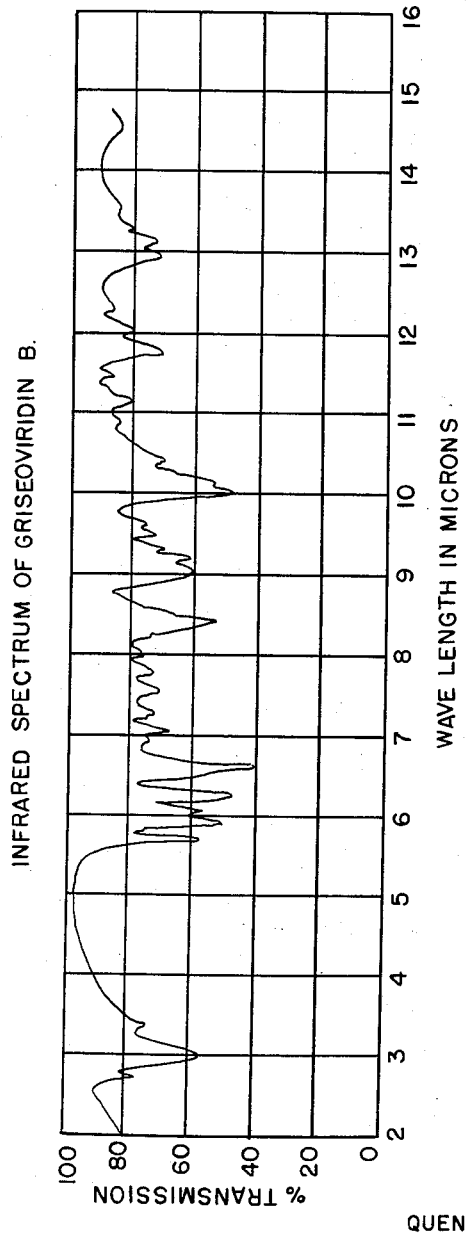

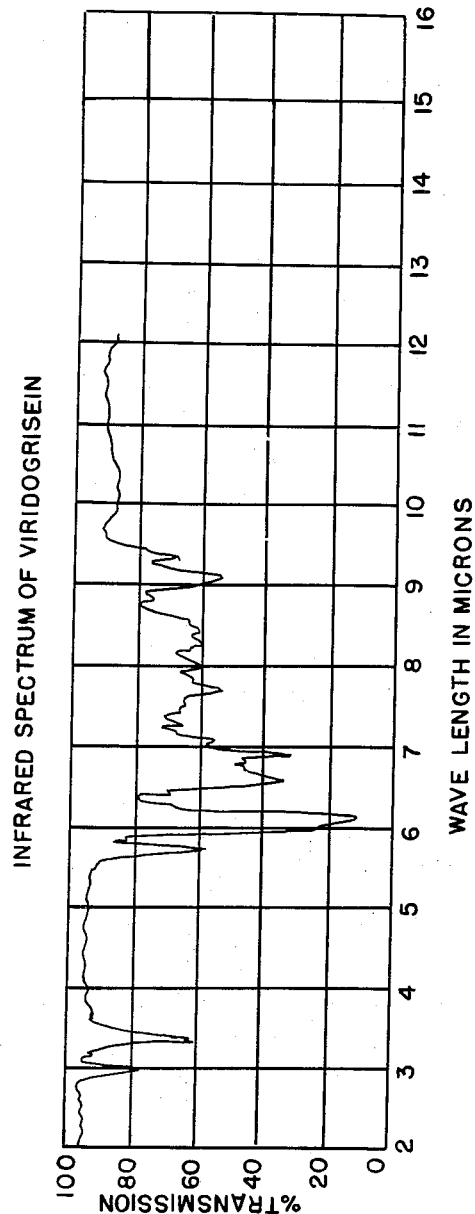

This application is a continuation-in-part of our application Serial No. 45,223, filed August 20, 1948 (now abandoned), and of our co-pending application Serial No. 284,572, filed April 26, 1952 (now abandoned). This invention relates to new chemical substances useful as therapeutic agents because of their antibiotic properties. More particularly, the invention relates to two new antibiotics which have been given the names griseoviridin and viridogrisein.

Griseoviridin is a neutral compound occurring in three crystal modifications dependent upon the solvent selected, which crystal modifications melt respectively with decomposition between about 158 and 166° C., 194 and 200° C. and 230 and 240° C. Griseoviridin contains by elemental analysis 55.2% carbon, 6.2% hydrogen, 23.0% oxygen, 8.6% nitrogen and 6.4% sulfur and has an optical rotation, $[\alpha]_D^{27}$, of about −237° in methanol at a concentration of 5 mg. per cubic centimeter. Griseoviridin is further characterized by an absorption maximum in the ultraviolet at 219–221 millimicrons, $E_{1\,cm.}^{1\%}$ being $870 \pm 30$ with water as solvent. When suspended in heavy mineral oil the crystalline modifications of griseoviridin exhibit two characteristic sets of absorption maxima in the infrared at the following wave lengths:

Type A (for the crystal modification melting with decomposition between about 230 and 240° C.): 2.98, 5.72, 6.05, 6.23, 6.60, 7.18, 7.70, 7.84, 8.36, 8.54, 8.98, 9.09, 9.40, 9.57, 9.75, 10.15, 10.46, 11.23, 11.84, 12.14, 12.95, and 13.67 microns.

Type B (for the crystal modification melting with decomposition between about 194 and 200° C.): 2.80, 3.03, 5.72, 5.94, 6.08, 6.25, 6.60, 7.08, 7.65, 7.84, 8.42, 9.05, 9.25, 9.58, 9.72, 10.09, 10.45, 11.20, 11.84, 12.13, 12.99, 13.17, and 13.66 microns.

In the drawings FIGURES 1 and 2 represent the infrared absorption spectra of griseoviridin Types A and B respectively.

Griseoviridin is moderately soluble in methanol, increasingly less soluble in higher alcohols, very soluble in pyridine, about 0.025% soluble in water and approximately as soluble in low molecular weight aliphatic esters such as ethyl and butyl acetates and even less soluble in non-polar solvents such as diethyl ether, chloroform, carbon tetrachloride, carbon disulfide, benzene and petroleum hydrocarbons. Griseoviridin is stable in distilled water for at least four weeks at 25 and 37° C., for at least five hours at 100° C., and in the pH range of 2.0 to 9.0 for at least twenty-four hours at room temperature (about 25° C.). It is destroyed within twenty-four hours at room temperature by 5% aqueous hydrochloric acid and within twenty-four hours by 5% alkali, the latter destruction taking place with the formation of a straw-yellow solution.

Griseoviridin gives a negative test for phenol or enol groups with ferric chloride and with Folin-Ciocalteu reagent, a negative Jacobs-Hoffman test for unsaturated lactones of the cardiac type, a negative Sakaguchi test for mono-substituted guanidine radicals and a negative test for functional, oxidized nitrogen groups. It does not form carbonyl derivatives of ketone or aldehyde function with hydroxylamine, semicarbazide, thiosemicarbazide or 2,4-dinitrophenyl hydrazine. It is readily oxidized by a cold, neutral, aqueous solution of potassium permanganate and explosively oxidized when heated alone in moist oxygen.

Viridogrisein is a chemical compound containing by elemental analysis 58.94% carbon, 7.21% hydrogen, 12.73% nitrogen and 21.12% oxygen. It has an optical rotation $[\alpha]_D^{25}$ of $+59°$ at a concentration of 5% in chloroform and $+28°$ at a concentration of 5% in absolute ethanol. Viridogrisein is characterized by absorption maxima in the ultraviolet at about:

303 millimicrons in methanol,
304 millimicrons in diethyl ether,
350 millimicrons in water,
333 millimicrons in 0.1 normal sodium hydroxide solution, and
303 millimicrons in water, pH 1.16.

In chloroform solution, viridogrisein exhibits absorption maxima in the infrared at the following wave lengths: 2.95, 3.28, 3.33, 5.71, 6.00 (shoulder), 6.10, 6.58, 6.80, 6.88, 7.08, 7.30, 7.57, 7.73, 8.07, 8.32, 8.48, 8.87, 9.13 and 9.39 microns. In the drawings FIGURE 3 represents the infrared absorption spectrum for viridogrisein.

Viridogrisein is a white, homogeneous, amorphous solid, soluble in ethyl acetate, ethylene dichloride, methanol, ethanol, n-butanol and benzene and sparingly soluble in water. It is soluble in diethyl ether and insoluble in petroleum ether. Viridogrisein is stable in distilled water at 25 and 37° C. for at least four weeks and at 100° C. in distilled water for at least five hours. It is stable within the pH range of 2 to 9 for at least twenty-four hours. It is not destroyed by 5% hydrochloric acid but is destroyed by alkali at pH 11.4 within twenty-four hours at 25° C.

Griseoviridin and viridogrisein possess antibiotic activity against actinomycetes, bacteria, rickettsiae and viruses in laboratory tests. In such tests both antibiotics possess acivity against *Actinomyces bovis, Nocardia asteroides, Corynebacterium diphtheriae, Diplococcus pneumoniae, Micrococcus pyogenes* var. *albus, Streptococcus agalactiae, Streptococcus pyogenes, Aerobacter aerogenes, Brucella abortus, Brucella melitensis, Brucella suis, Hemophilus pertussis, Neisseria catarrhalis, Neisseria meningitidis, Vibrio comma, Rickettsia prowazekii* and one of the pleuro-pneumonia-like organisms. Griseoviridin also exhibits antibiotic activity against the Miyagawanella responsible for meningopneumonitis and some strains of *Escherichia coli, Salmonella typhosia* and *Shigella sonnei*. Viridogrisein also exhibits antibiotic activity against *Pasteurella bollingeri* and *Micrococcus pyogenes* var. *aureus*, including the strains resistant to penicillin and other antibiotics.

Viridogrisein is useful in chronic mastitis of lactating cows. The organisms associated with numerous successfully treated cases of bovine mastitis include hemolytic and non-hemolytic streptococci (including *Streptococcus agalactiae* and *Streptococcus pyogenes*), staphylococci (*Micrococcus pyogenes* var. *albus* and *aureus*, including strains resistant to penicillin and other antibiotics) and/or colon bacilli (strains of *Escherichia coli*). The clinical utility of griseoviridin for veterinary purposes and the utility of viridogrisein in the treatment of other diseases of domesticated animals have not yet been proven.

The new antibiotic compounds of this invention, griseoviridin and viridogrisein, may be prepared from cultures of an Actinomycete, a strain of the species *Streptomyces griseus* (NRRL 2426). This organism was initially isolated from the soil of a tomato seed bed at Florida City, Florida, U.S.A. The organism forms branched slender aerial mycelia, rarely or not septate, which give rise to chains of unicellular conidia. When grown on glucose-tryptone agar medium, the moist young primary mycelium appears colorless, later turning to yellowish-tan; the aerial secondary mycelium is at first white, later turning to a light pink and then to a grayish green. Little or no pigment appears in the agar. Surface colonies are circular, raised or umbonate, wrinkled or radially ridged, with an entire or undulate margin. Microscopically, the moist primary mycelium is hyaline and much-branched. The aerial secondary mycelium is branched and straight to slightly wavy. The distal portions of the aerial mycelium subdivide into conidial chains averaging 60 microns in length. The conidia are hyaline and ovoidal, averaging 0.75 micron in diameter (range 0.5 to 1.0) and 1.1 micron in length (range 0.8 to 2.6).

Table I illustrates the characteristic differences between this new actinomycete and other antibiotic-producing actinomycetes when grown on glucose-tryptone agar medium.

trehalose, d-xylose, and less readily aesculin, adonitol, dulcitol, inositol, inulin, lactose, melezitose, melibiose, raffinose, d-sorbitol and sucrose. It also readily utilizes alkali metal salts of organic acids such as sodium acetate, sodium citrate, and sodium succinate.

Table II serves to distinguish our strain of *Streptomyces griseus* (NRRL 2426) from other antibiotic-producing actinomycetes on the basis of ability to utilize various carbon sources when grown on a medium composed of agar, inorganic salts and the carbon source being tested.

TABLE I

*Appearance on Glucose-Tryptone Agar[1] of Streptomyces Griseus and Other Antibiotic Species of Streptomyces*

| Species of streptomyces | Antibiotic elaborated | Mycelium | | | Substrate, color formed in agar |
|---|---|---|---|---|---|
| | | Form of aerial mycelium | Color of aerial mycelium and spores | Color of reverse | |
| S. griseus, NRRL 2426 | Griseoviridin, viridogrisein. | Straight to slightly wavy. | White to light pink to light grayish green. | Yellow to gray | None. |
| S. aureofaciens | Aureomycin | ---do--- | White to gray | Yellow to tan | Do. |
| S. floridae | Viomycin | ---do--- | White to lavender to grayish green. | Purple | Do. |
| S. fradiae | Neomycin, fradicin | Straight, occasional loops and spirals. | White to sea shell pink | Colorless to yellow tan | Do. |
| S. griseus, Waksman 9 | Streptomycin, actidione | Straight to slightly wavy. | White to light pink to light grayish green. | Colorless to light brown to lavender. | Do. |
| S. lavendulae | Streptothricin, lavendulin, streptolin. | Straight, occasional loops and spirals. | White to pink to lavender | Black | Black. |
| S. rimosus | Terramycin rimocidin | Spirals | White to tan | Yellow to brown | None. |
| S. venezuelae | Chloramphenicol | Straight | White to gray | Black | Black. |

[1] Selman A. Waksman, J. Bact. 46: 300, 1943.

Griseoviridin and viridogrisein are also obtained by cultivation of a strain of *Streptomyces griseoviridus*. This strain was first isolated from a soil obtained from an oatfield near Hale Center, Texas, U.S.A. The strain is similar to our strain of *Streptomyces griseus*, described above in the color of its spores in mass, in utilization of carbohydrates and in rate of peptonization of milk and liquefaction of gelatin. It differs from *Streptomyces griseus* in the formation of spirals by aerial hyphae and the appearance of a dark brown pigment in the medium,

TABLE II

*Carbohydrate Utilization by Streptomyces griseus and Other Antibiotic Species of Streptomyces Grown on Synthetic Agar[1]*
[0 = no growth, + = poor growth, ++ = fair growth, +++ = good growth, ++++ = very heavy growth]

| Species of streptomyces | Antibiotic elaborated | Carbon Source | | | | | | | | | | | | |
|---|---|---|---|---|---|---|---|---|---|---|---|---|---|---|
| | | l-Arabinose | Dulcitol | d-Fructose | d-Galactose | l-Inositol | Inulin | Lactose | Maltose | d-Mannitol | Raffinose | Rhamnose | d-Sorbitol | Sucrose | d-Xylose |
| S. griseus B, NRRL 2426 | Griseoviridin, viridogrisein. | ++++ | 0 | ++++ | ++++ | 0 | 0 | ++ | ++++ | ++++ | 0 | ++++ | 0 | Sl.+ | ++++ |
| S. aureofaciens | Aureomycin | ++++ | 0 | ++++ | ++++ | 0 | 0 | ++ | +++ | 0 | 0 | 0 | ++++ | ++ | |
| S. floridae | Viomycin | 0 to ++ | 0 | ++++ | ++++ | 0 | 0 to + | + to ++ | ++++ | ++++ | 0 | 0 | 0 to + | 0 to + | ++++ |
| S. fradiae | Neomycin, fradicin. | ++++ | 0 | 0 to + | ++++ | 0 | 0 to + | Sl.+ to + | ++ to +++ | 0 | 0 | 0 | 0 to sl.+ | 0 | +++ |
| S. griseus B, Waksman 9 | Streptomycin, actidione. | 0 to sl.+ | 0 | ++++ | ++++ | 0 | 0 to sl.+ | 0 to +++ | ++++ | ++++ | 0 | 0 | 0 to sl.+ | 0 to sl.+ | ++++ |
| S. lavendulae | Streptothricin, lavendulin, streptolin. | 0 to ++++ | 0 | 0 to ++++ | Sl.+ to ++++ | 0 | 0 to sl.+ | 0 to +++ | ++++ | 0 | 0 | 0 to + | 0 | 0 | 0 to ++++ |
| S. rimosus | Terramycin, rimocidin. | ++++ | 0 | ++++ | ++++ | ++++ | 0 | ++++ | ++++ | ++++ | + to +++ | 0 | ++++ | 0 | Sl.+ to + |
| S. venezuelae | Chloramphenicol. | ++++ | 0 | ++++ | ++++ | 0 | + | ++++ | 0 | ++++ | 0 | 0 | ++++ |

[1] J. G. Pridham and David Gottlieb, J. Bact. 56: 108, 1948.

The organism liquefies gelatin, causing a very slight browning, peptonizes litmus milk with a basic reaction, causes a darkening of Dorset egg medium, sporulates on many solid media such as glucose-tryptone agar and Moyer's-sporulation-agar media, utilizes inorganic and organic nitrogen sources including nitrates, ammonium salts, amides, amino acids, amines, peptides and peptones. In synthetic medium (Gottlieb's) the organism readily utilizes numerous carbon sources, including l-arabinose, cellobiose, dextrin, dextrose, d-fructose, d-galactose, glycerol, maltose, d-mannose, d-mannitol, rhamnose, salicin, starch, when grown on various solid organic media, including glucose-tryptone agar and gelatin.

Cultures of our strains of *Streptomyces griseus* and *Streptomyces griseoviridis* have been filed with the Parke, Davis and Company Culture Bureau under the numbers 04797 and 04955, respectively, and in the culture collection of the Northern Utilization Research and Development Division of the U.S. Department of Agriculture at Peoria, Illinois, under the numbers NRRL 2426 and NRRL 2427, respectively.

Cultures of *Streptomyces griseus* and *Streptomyces*

*griseoviridus* may be obtained by mixing cultures of the specific bacteria inhibited by the griseoviridin and viridogrisein with aqueous agar and adding a soil containing the desired *Streptomyces griseus* and *Streptomyces griseoviridus*. After incubating the mixture for one to ten days, colonies of the desired Actinomycetes and other antagonists appear. The *Streptomyces griseus* and *Streptomyces griseoviridus* growths are selected, transferred to a fresh nutrient medium and later isolated as a pure culture in accordance with the conventional procedures.

According to the invention, griseoviridin and viridogrisein are produced by inoculating a suitable nutrient medium with *Streptomyces griseus* or *Streptomyces griseoviridus*, incubating the mixture under aerobic conditions at about 20 to 40° C. for about two to fifteen days and then isolating the antibiotics from the culture medium. The cultivation of the microorganism can be carried out in a number of different ways. For example, the microorganism may be cultivated under aerobic conditions on the surface of the medium or it may be cultivated beneath the surface of the medium, i.e. in the submerged condition, if oxygen is simultaneously supplied.

Briefly stated, the production of these new antibiotics by the surface culture method involves inoculating a solid nutrient medium or a shallow layer, usually less than about 2 cm. of a sterile, aqueous nutrient medium with *Streptomyces griseus* or *Streptomyces griseoviridus* and incubating the mixture under aerobic conditions at a temperature between about 20 and 40° C., preferably at room temperature or slightly higher (about 25–28° C.), for a period of about ten to fifteen days. The cycelium is then removed from the liquid culture and the culture liquid is then treated by the methods hereinafter described for isolating therefrom the desired griseoviridin and viridogrisein. The isolation of the antibiotics from the solid cultures is carried out in a similar way except that in most cases water or some other solvent for the antibiotics is first added to the culture mixture, the mixture homogenized or mixed well and then the solids removed from the liquid.

The preferred method for preparing griseoviridin or viridogrisein on a large scale involves the use of submerged or deep cultures of the organism. According to this embodiment of the invention a sterile, aqueous nutrient medium is inoculated with *Streptomyces griseus* or *Streptomyces griseoviridus* and incubated with agitation and aeration at a temperature of about 20 to 40° C., preferably in the neighborhood of 25° C. for about two to seven days. Under these conditions the organism develops as numerous more or less discrete particles dispersed throughout the medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermenters equipped with suitable agitation and aeration devices as well as horizontal rotary drum fermenters have been found to be particularly useful in this respect. However, for the preparation of smaller quantities of the antibiotics or of cultures of the microorganism this submerged culture method may be carried out in small flasks which are either shaken or stirred by suitable mechanical means.

Agitation and aeration of the culture mixture may be accomplished in a number of ways. Agitation may be provided by an impeller, or similar agitation device, by revolving or shaking the fermenter itself, by various pumping devices, or by the passage of air or other oxygen-containing gases through the medium. Aeration may be effected by injecting air, or other oxygen-containing gases into the fermentation mixture through open pipes, perforated pipes, porous diffusion media such as carbon sticks, Carborundum, sintered glass and the like, or it may be provided by spraying, splashing or spilling the mash or culture into or through an oxygen-containing atmosphere.

A wide variety of nutrient media may be used in the growing stage of the process. However, it has been found that the best results are obtained when a medium containing an assimilable carbon source and a proteinaceous material is employed. "Assimilable carbon source" is here understood to include polyhydric alcohols and mono-, di- and poly-saccharides while the term "proteinaceous material" includes unmodified protein and protein degradation products, particularly such products as arise from the hydrolysis of proteins. These protein degradation products include proteases, peptones, polypeptides, peptides and amino acids. As is well-known to those skilled in the art, the medium should also contain minerals of the type commonly employed in nutrient media. Some specific examples of such mineral constituents are sodium chloride, potassium chloride, calcium carbonate, sodium carbonate, sodium bicarbonate, sodium acetate, sodium citrate, sodium succinate, disodium phosphate, sodium dihydrogen phosphate, dipotassium phosphate, potassium dihydrogen phosphate, ferric tartrate, copper sulfate and magnesium sulfate.

As assimilable carbon sources glycerol, *l*-arabinose, cellobiose, dextrin, dextrose, *d*-fructose, *d*-galactose, maltose, *d*-mannose, *d*-mannitol, rhamnose, salicin, starch, trehalose, *d*-xylose, and less readily aesculin, adonitol, dulcitol, inositol, inulin, lactose, melezitose, melibiose, raffinose, *d*-sorbitol and sucrose may be mentioned. These carbon sources may be supplied to the medium in purified form or in the form of concentrates. Thus, starch may be supplied as unmodified starch or as high fluidity (acid modified) starch, or it may be subjected to the action of acid or liquefying enzymes in the course of the preparation of the medium. Glucose, being one of the normal components of corn-steep liquor or of the dried solids thereof, may be supplied in this form or as the purified sugar or corn syrup. Grain mashes, such as corn, wheat or barley mash, either malted or unmelted, may also be used. Such mashes are particularly suitable because they provide at a low cost not only starch and dextrins, but also an appreciable quantity of minerals, growth factors and proteinaceous materials which are favorable to the production of the antibiotics. Some of the grain mashes, as well as some whey concentrates, are sufficiently rich in protein that extra proteinaceous adjuncts need not be added to the medium. Lactose, although one of the poorer carbon sources mentioned, may be supplied either as the purified sugar or as whey or whey concentrates. It is, of course, to be understood that various mixtures and combinations of the above carbon sources may be used.

A wide variety of protein aceous materials may be used in the medium. Thus, acid-hydrolyzed casein, enzyme-hydrolyzed casein, distillers gain slops, dried distillers solubles, corn-steep liquor, wheat-steep liquor, whey or whey concentrates, soybean oil meal, acid-hydrolyzed corn gluten, acid-hydrolyzed wheat gluten, peptone, offals, brewer's yeast and the like as well as synthetic mixtures of numerous amino acids may be used. These proteinaceous materials need not be supplied in a high degree of purity as the less pure materials which carry traces of growth factors and considerable quantities of mineral nutrients are suitable for use. A mixture of corn-steep liquor solids with soybean oil meal or saline-extracted hog stomach residue is especially advantageous for the purposes of the instant invention.

The time required to obtain the maximum yields of the antibiotics in the nutrient medium varies with the method of cultivating the organism but, in general, the maximum yields are obtained within two to fifteen days. In the case of aerated submerged cultures the maximum yield is usually obtained within two to seven days while about ten to twelve days are required in the case of surface cultures. However, in either case when an aqueous nutrient medium is used, the pH should be maintained between about 6 and 9. A starting pH of about 6.5 to 8.2 has been found to be optimal for favoring rapid production of the antibiotics and hence is the preferred starting pH range.

The isolation of griseoviridin and viridogrisein from the culture medium can be accomplished in a number of different ways. One of such methods involves filtering the liquid culture medium, extracting the filtrate with ethylene dichloride, distilling off most of the ethylene dichloride from the extract in vacuo and collecting the crystalline griseoviridin which separates therefrom. The aqueous layer (Solution A) is retained and more of the griseoviridin isolated therefrom by the methods described below.

The ethylene dichloride filtrate from the separation of the griseoviridin is evaporated to dryness in vacuo, the residue washed with petroleum ether and the petroleum ether extracts saved and small amounts of viridogrisein isolated therefrom. The residue is extracted with benzene and the benzene insoluble fraction (Solid A) is saved for further purification and fractionation as described below.

The benzene extract is evaporated to dryness in vacuo, the residue washed with petroleum ether and the insoluble material which consists of viridogrisein dried in vacuo.

Solid A is taken up in a small amount of methanol, the insoluble material removed and discarded and the filtrate diluted with ethyl acetate. The griseoviridin which separates from the solution upon standing is collected and the filtrate utilized to obtain further crops of the crystalline antibiotic.

The griseoviridin present in the aqueous solution labeled "Solution A" can be isolated in the following manner:

The solution is extracted with n-butanol, the aqueous layer discarded and the n-butanol extracts evaporated almost to dryness in vacuo. The residue is taken up as completely as possible in methanol and the impurities fractionally precipitated in dilution with ethyl acetate. The filtrate is concentrated in vacuo and several crops of insoluble impurities removed during the evaporation process. When the volume of the filtrate reaches about 0.1 of the original volume, the evaporation is discontinued and the griseoviridin which crystallizes from the solution collected and dried.

The invention is illustrated by the following examples.

EXAMPLE 1

A mixture consisting of 180 g. of soluble starch, 270 g. of soybean oil meal, 54 g. of corn-steep liquor solids, 90 g. of sodium chloride, 180 g. of lard (to prevent foaming), 15 cc. of 10 N sodium hydroxide and sufficient water to bring the volume to eighteen liters is placed in a 30-liter glass stationary vat-type fermenter provided with a stainless-steel head and impeller-type agitator. The fermenter also contains vertical baffle plates and, near the bottom, a perforated circular air diffusion ring.

The fermenter and medium are placed in an autoclave and sterilized by steam under seventeen pounds pressure for seventy-five minutes. The cool medium is inoculated with a 10-cc. spore suspension washed from a 7-day-old glucose-tryptone agar slant of Streptomyces griseus (NRRL 2426).

After inoculation, the culture mixture is incubated at 25° C. for one hundred and twelve hours. During the incubation period sterile air is passed through the diffusion ring into the medium at the rate of 0.71 to 0.81 liter per liter of medium per minute and the agitator rotated at 150 to 200 r.p.m. The pH during the incubation varies from 6.48 to 6.94.

Periodic tests of small portions of the culture medium against *Micrococcus pyogenes* var. *aureus* are used to follow the production of the antibiotics. The following table is representative of the results obtained by such tests.

| Incubation period, hours | Antibiotic activity against *Micrococcus pyogenes* var. *aureus* | |
|---|---|---|
| | Percent inhibition | Dilution |
| 47 | 69 | 1–50 |
| 71 | 60 | 1–250 |
| | 39 | 1–400 |
| 95 | 67 | 1–400 |
| 112 | 47 | 1–800 |

13.3 liters of the culture liquid or "beer" produced above is filtered through a 180-g. pad of aluminum silicate filter aid and the residual cake washed by stirring it for one-half hour with a volume of water equal to 0.1 that of the crude beer. The combined filtrate and wash liquid, volume 13.6 liters, is extracted four times with 0.25 volume of ethylene dichloride. The aqueous layer which assays 57% inhibition against *Micrococcus pyogenes* var. *aureus* at a dilution of 1 to 50 is stored at 5° C. This aqueous solution will hereinafter be designated at Solution A.

The ethylene dichloride extracts are combined and the solvent removed by distillation in vacuo at 30° C. The residue which is amber-colored and oily in appearance is treated with 50 cc. of petroleum ether to obtain a buff-colored precipitate. The mixture is stored for several days at 5° C., the precipitate collected by centrifugation and the flask washed three times with 5-cc. portions of petroleum ether. The petroleum ether supernatant and washes are combined, volume 63 cc., and assayed against *Micrococcus pyogenes* var. *aureus*. The petroleum ether solution in this particular run assayed 46% inhibition at a dilution of 1 to 20,000.

The petroleum ether adhering to the insoluble material is removed in vacuo and the residue extracted four times with 10-cc. portions of ethyl acetate. The ethyl acetate insoluble material is dried in vacuo and saved for further purification; weight 252.4 mg.; a solution containing 50 mcg./cc. produces a 67% inhibition against *Micrococcus pyogenes* var. *aureus* at a dilution of 1 to 10. This solid will be hereinafter referred to as Solid A.

The ethyl acetate is removed from the combined extracts by distillation in vacuo at a temperature below 30° C. The residue which has the color and consistency of molasses contains some crystals of griseoviridin. The crystals are removed by filtration as completely as possible and the filtrate treated with a small amount of kerosene. After standing awhile, the kerosene is decanted off and ethyl acetate added to the gummy residue. The crystalline griseoviridin which fails to dissolve in the ethyl acetate is collected, combined with the other crystalline material and the combined crystals washed with ethyl acetate. After drying in vacuo the white, crystalline griseoviridin obtained at this point weighs 46.3 mg. The crystals are sparingly soluble in water, ethyl acetate, ethylene dichloride, chloroform, benzene and diethyl ether but soluble in methanol. They melt at 192.6–193.6° C. (corrected) and by analysis contain 54.99% carbon and 6.23% hydrogen. 2.5 mcg./cc. of the crystalline griseoviridin produces a 53% inhibition in the growth of *Micrococcus pyogenes* var. *aureus*.

The ethyl acetate mother liquors from the separation of the griseoviridin are evaporated to dryness, treated with petroleum ether and the insoluble material dried in vacuo to obtain 132.5 mg. of a light-colored solid. A 50 mcg./cc. solution of this solid (crude viridogrisein)

causes a 46% inhibition in the growth of *Micrococcus pyogenes* var. *aureus* at a dilution of 1 to 100.

An additional quantity of griseoviridin is obtained from Solid A in the following manner:

225 mg. of Solid A is dissolved in 5 cc. of methanol at room temperature and the solution filtered to remove a small amount of brown, insoluble material. The flask and filter are washed three times with 2-cc. portions of methanol and the washings and filtrate combined. 25 cc. of dry ethyl acetate is added to the light-brown solution and the solution concentrated to a volume of 4 to 5 cc. The mixture which has started to crystallize is transferred to a clean vessel with the aid of 5 cc. of ethyl acetate, allowed to stand at −5° C. for three to four hours and the crystals of griseoviridin collected. The crystals are washed with three small portions of cold ethyl acetate and dried in vacuo; weight 145 mg. The griseoviridin obtained in this manner melts at 198.4° C., has an optical rotation in methanol at 26.5° C. of −233.9±0.4 and contains, by analysis, 54.40; 54.34% carbon; 5.66; 5.72% hydrogen and 8.96% nitrogen. 2.5 mcg. of this crystalline antibiotic when dissolved in 1 cc. of water produces a 51% inhibition in the growth of *Micrococcus pyogenes* var. *aureus* and a 35% inhibition in the growth of *Shigella sonnei*.

Solution A is utilized for the production of further quantities of griseoviridin in the following manner:

340 g. of ammonium sulfate is added to the 13.6 liters of Solution A and the solution extracted with two 0.25 volumes of n-butanol. The aqueous layer is discarded and the butanol extract evaporated almost to dryness in vacuo at 50° C. The residue is extracted with methanol and the insoluble gummy material discarded. The methanol solution is subjected to fractional precipitation to remove the impurities from the grieseoviridin in the following manner:

2.5 volumes of ethyl acetate is added to the methanol solution and any precipitate which forms removed and discarded. Sufficient ethyl acetate is added to the filtrate to bring the volume to five times the volume of the original methanol solution and the precipitate which forms removed and discarded. The filtrate is concentrated to about 0.6 volume, allowed to stand overnight at 5° C. and the solid which separates collected and discarded. The filtrate is concentrated in vacuo to 0.3 to 0.4 of the original volume, allowed to stand at 5° C. and the solid which separates collected and discarded. The filtrate is concentrated to 0.1 of the original volume, stored overnight at 5° C. and the crystalline griseoviridin which separates collected, washed with ethyl acetate and dried in vacuo. On further storage of the filtrate at 5° C. a second crop of the crystalline griseoviridin, which is not quite as pure as the first crop, is obtained.

EXAMPLE 2

A mixture consisting of 180 g. of soluble starch, 270 g. of soybean oil mean, 54 g. of corn-steep liquor solids, 90 g. of sodium chloride, 180 g. of lard (to prevent foaming), 15 cc. of 10 N sodium hydroxide solution and sufficient water to bring the volume to eighteen liters is placed in a 30-liter glass stationary vat-type fermenter provided with a stainless-steel head and impeller-type agitator. The fermenter also contains vertical baffle plates and, near the bottom, a perforated circular air diffusion ring.

The fermenter and medium are placed in an autoclave and sterilized by steam under seventeen pounds pressure for svenety-five minutes. The fermenter is cooled, removed from the autoclave and the medium inoculated with 10 cc. of a spore suspension washed with a 7-day-old glucose-tryptone agar slant of *Streptomyces griseus* (NRRL 2426).

After inoculation, the culture mixture is incubated at 25° C. for one hundred and twelve hours. During the incubation period sterile air is passed through the diffusion ring into the medium at the rate of 0.38 liter per liter of medium per minute and the agitator rotated at a speed of about 200 r.p.m.

The test data shown in the following table is illustrative of the yields of the combined antibiotics obtained by the method described above.

| Incubation period, hours | Antibiotic activity against *Micrococcus pyogenes* var. *aureus* | |
|---|---|---|
| | Percent inhibition | Dilution |
| 64 | 66 | 1–150 |
| | 39 | 1–250 |
| 88 | 61 | 1–400 |
| | 44 | 1–600 |
| 112 | 61 | 1–300 |
| | 38 | 1–500 |

A total of 38.6 liters of filtered culture liquid prepared as described above is extracted twice with 0.25 volume of ethylene dichloride and the aqueous layer extracted twice with 0.25 volume of n-butanol. The aqueous layer is discarded and the butanol layer concentrated to a volume of 1305 cc. in a circulating still at 45 to 50° C. The butanol concentrate is evaporated to dryness in vacuo at 50° C. and the residue mixed with 80 cc. of absolute methanol. The dark gummy material which fails to dissolve is discarded and the filtrate allowed to stand. Upon standing and after centrifuging three layers form: a top, dark-amber layer, a middle layer, which is a colored precipitate and a bottom layer which is a light yellow, oily-appearing solution. The middle and bottom layers are washed with two 5-cc. portions of methanol and the insoluble material discarded. The methanol washes are combined with the top layer and the resulting solution treated with 200 cc. of ethyl acetate. The precipitate which forms is removed and dried; weight 0.525 g.

The filtrate is treated with an additional 180 cc. of ethyl acetate and the precipitate which forms collected and dried. This material weights 1.4698 g. The filtrate is concentrated to a volume of about 300 cc. in vacuo, allowed to stand overnight at 5° C. and the precipitate which separates collected and dried; weight 1.8204 g. The filtrate is concentrated in vacuo below 30° C. to a volume of 150 to 200 cc. and the precipitate which forms upon standing at 5° C. collected and dried; weight 1.770 g. The filtrate is concentrated in vacuo to a volume of 50 cc., stored overnight at 5° C. and the crystals of griseoviridin which separate collected. These crystals after washing three times with 1-cc. portions of ethyl acetate and drying in vacuo weigh 380.1 mg. and melt at 187.5–193° C. (uncorrected); 195–200.7° C. (corrected). The filtrate is allowed to stand and the further quantity of griseoviridin which separates is collected, washed with three 1-cc. portions of ethyl acetate and dried; weight 133.1 mg.

The crude griseoviridin is dissolved in 12.5 cc. of absolute methanol and 30 cc. of ethyl acetate added to the solution. The solution is concentrated to 5 cc. in vacuo, cooled to 5° C. and the crystalline griseoviridin collected; yield 273.8 mg.; M.P. 193–194° C. (uncorrected), 200.7–201.7° C. (corrected); $[\alpha]_D^{27.5} = -238\pm1$. A solution containing 200 mcg./cc. causes a 42% inhibition in the growth of *Micrococcus pyogenes* var. *aureus* at a dilution of 1 to 80. A further quantity of the desired griseoviridin crystallizes from the filtrate upon standing; yield 39.7 mg.; M.P. 186.5–189.8° C. (uncorrected); 194–197.3° C. (corrected).

The filtrate from the second crop of griseoviridin is concentrated to dryness to obtain a light-colored solid consisting chiefly of griseoviridin. Viridogrisein present in the original culture liquid can be isolated from the ethylene dichloride extracts of the crude beer by the methods hereinafter described.

EXAMPLE 3

A nutrient medium is prepared by adding sufficient water to a mixture consisting of 90 g. of dried saline extracted hog stomach residue, 180 g. of maltose, 90 g. of corn-steep liquor solids, 90 g. of sodium chloride and 180 g. of lard (to prevent foaming) to bring the volume to eighteen liters. The pH is adjusted to about 8 by the addition of 25 cc. of 10 N sodium hydroxide solution and the mixture which is contained in a 30-liter fermenter of the type described in Examples 1 and 2 is sterilezed with steam under a pressure of seventeen pounds for two hours. The cool medium is inoculated with 10 cc. of a spore and mycelium suspension of a seven-day culture of *Streptomyces griseus* (NRRL 2426) on glucose-tryptone agar medium grown in a Penicillium surface culture bottle and momentarily homogenized.

After inoculation, the culture mixture is incubated at 28° C. for eighty-eight hours. During the incubation sterile air is passed into the solution through a U-tube in such a manner that the two streams of air strike the ends of the turbine-type impeller. The impeller is rotated at about 200 r.p.m. and the air is passed into the medium at the rate of 1 liter per liter of medium per minute.

From time to time samples of the culture mixture are withdrawn and assayed for antibiotic content by the turbidimetric method against *Micrococcus pyogenes* var. *aureus*. The following table shows representative yields obtained by the method described above.

| Incubation period, hours | pH of medium | Antibiotic activity against *Micrococcus pyogenes* var. *aureus* | |
|---|---|---|---|
| | | Percent inhibition | Dilution |
| 40 | 6.43 | 25 | 1- 50 |
| 64 | 6.58 | 52 | 1-250 |
| 88 | 6.71 | 55 | 1-800 |

(*a*) 17 liters of a filtered culture liquid produced as described above and assaying 57% inhibition in the growth of *Micrococcus pyogenes* var. *aureus* at a dilution of 1 to 400 is extracted with two 4-liter portions of ethylene dichloride. The aqueous layer which assays 40% inhibition in the growth of *Micrococcus pyogenes* var. *aureus* at a dilution of 1 to 50 is saved for later processing. This solution will hereinafter be designated as Solution A.

The combined ethylene dichloride extracts are concentrated to a volume of 240 cc. in vacuo and the residue allowed to stand in a refrigerator. The crystalline griseoviridin which separates at this point is collected, washed with 10 cc. of ethylene dichloride and dried in vacuo; yield 185.1 mg.; M.P. 185–189.2° C. (corrected). The crystalline product is taken up as completely as possible in 2.3 cc. of absolute methanol, the solution filtered and 6.25 cc. of ethyl acetate added to the filtrate. The solution is allowed to stand overnight at 5° C., concentrated to a volume of slightly more than 3 cc. and again allowed to stand overnight at 5° C. The crystals of the purified griseoviridin are collected, washed with 1 cc. of ethyl acetate and dried in vacuo; yield 82.8 mg.; M.P. 191–193.5° C. (corrected); optical rotation $$[\alpha]_D^{27.5} = -237 \pm 1$$

in methanol. 2.5 mcg. dissolved in 1 cc. of water produces a 43% inhibition in the growth of *Micrococcus pyogenes* var. *aureus*.

The ethylene dichloride filtrate and wash solutions from above are evaporated to dryness in vacuo to obtain an oily amber-colored residue. 25 cc. of petroleum ether is added to the residue and the mixture allowed to stand overnight at 5° C. The light-colored precipitate (Solid A) is collected, washed with two 5-cc. portions of petroleum ether and dried in vacuo; weight 704.6 mg.; 50 mcg. in 1 cc. of water causes a 42% inhibition in the growth of *Micrococcus pyogenes* var. *aureus* at a dilution of 1 to 400. The petroleum ether extracts, volume 27.5 cc., cause a 56% inhibition in the growth of *Micrococcus pyogenes* var. *aureus* at a dilution of 1 to 10,000.

(*b*) 15 liters of filtered culture liquid produced as described above (assay; 67% inhibition in the growth of *Micrococcus pyogenes* var. *aureus* at a dilution of 1 to 800) is extracted twice with 3.75 liters of ethylene dichloride. The aqueous layer (Solution B) which causes a 47% inhibition in the growth of *Micrococcus pyogenes* var. *aureus* at a dilution of 1 to 50 is saved for further processing as hereinafter described.

The ethylene dichloride extracts are concentrated to dryness in vacuo to obtain an oily, amber-colored residue. The residue is treated with three successive 25-cc. portions of petroleum ether and the insoluble material collected. The combined precipitates are washed with 5 cc. of petroleum ether and dried in vacuo. This solid which will hereinafter be called Solid B weighs 892.4 mg. and a 50 mcg./cc. solution produces a 58% inhibition in the growth of *Micrococcus pyogenes* var. *aureus* at a dilution of 1 to 200. The petroleum ether washes, volume 71 cc., cause a 47% inhibition in the growth of *Micrococcus pyogenes* var. *aureus* at a dilution of 1 to 2500.

(*c*) 879.7 mg. of Solid B is mixed with 690.2 mg. of Solid A and the mixture stirred for one and a quarter hours with 157 cc. of benzene. The insoluble material which consists of griseoviridin is collected, dried in vacuo and purified by dissolving it as completely as possible in 2.3 cc. of dry methanol. The solution is filtered, the residue washed with 1.5 cc. of methanol and 9 cc. of ethyl acetate added to the filtrate. The filtrate is concentrated to a volume of about 3 cc., allowed to stand at 5° C. for several days and the crystalline griseoviridin collected. The crystals are washed five times with small portions of cold ethyl acetate and dried in vacuo; yield 82.7 mg.; M.P. 192.5–4.0° C. (corrected).

The benzene filtrate from above is placed in a red flask and evaporated to dryness in vacuo to obtain the desired viridogrisein; yield 973 mg. The viridogrisein produced in this manner is an off-shade-white to light-buff, amorphous solid which upon ultraviolet absorption analysis shows absorption maxima at 348 m$\mu$ in water; at 333 m$\mu$ in 0.1 N sodium hydroxide and at 302 m$\mu$ at pH 1.4. It is more soluble in water than griseoviridin and soluble in ethyl acetate, ethylene dichloride, methanol, ethanol, n-butanol and benzene. It is soluble in diethyl ether and insoluble in petroleum ether. A solution of this preparation at a concentration of 50 mcg./cc. produces a 52% inhibition in the growth of *Micrococcus pyogenes* var. *aureus* at a dilution of 1 to 400.

(*d*) Further quantities of griseoviridin can be isolated from Solutions A and B by the methods illustrated in Examples 1 and 2 for the isolation of griseoviridin from the aqueous solution remaining after ethylene dichloride extraction of the crude filtered beer.

(*e*) One of the simplest methods for isolating griseoviridin from the culture liquids is carried out as follows.

16 liters of filtered culture liquid prepared as described above is extracted with two 4-liter portions of ethylene dichloride. The aqueous layer is saved for isolation of griseoviridin via the butyl alcohol extraction procedure already described and the ethylene dichloride extract concentrated to 0.03 volume in vacuo at 50° C. The concentrate is allowed to stand at 5° C. until crystallization is complete and then the crystalline griseoviridin collected, washed with ethyl acetate and dried in vacuo. The ethylene dichloride filtrate and washings are combined and processed for viridogrisein and more griseoviridin as heretofore described.

In the preceding examples methods have been described for producing the new antibiotics of the invention in certain nutrient media and isolating them therefrom. The following examples are given for the purpose of illustrating the use of other nutrient media and conditions for the production of these new products and consequently the isolation procedures which are similar to those already described will not be repeated. It should be understood, however, that all of the above described isolation procedures are applicable to the culture liquids produced in the following examples.

EXAMPLE 4

A mixture consisting of 3 g. of beef extract, 3 g. of peptone, 6 g. of maltose, 3 g. of sodium chloride and sufficient water to make 600 cc. is adjusted to pH 7.5 to 7.7 with 10 N sodium hydroxide solution. 300-cc. portions of the nutrient medium thus prepared are placed in two one-liter wide-mouth Erlenmeyer flasks and the flasks capped with three layers of gauze-cotton milk filter discs secured in place with spring clips. The flasks are placed in an autoclave and sterilized with steam at eighteen pounds pressure for twenty minutes. After cooling, the flasks are opened and the media inoculated with spore suspensions obtained by adding sterile water containing 0.01% castile soap to a sporulating culture of *Streptomyces griseus* (NRRL 2426) grown on a glucose-tryptone agar medium in test tube slopes or slants.

The flasks are capped and the media incubated for four days at 22 to 24° C. on a rotary-type shaking machine (150 r.p.m.; radius of circle 2 inches). At the end of this time the culture mixture is filtered through a Seitz filter and the filtrate tested for antibiotic activity and then, if desired, the antibiotics contained therein isolated as described in Examples 1 and 2.

A typical filtrate prepared as described above caused 52% inhibition of *Shigella sonnei* at a 1 to 10 dilution, 93% inhibition of *Micrococcus pyogenes* var. *aureus* at a 1 to 10 dilution and 89% inhibition of the latter organism at a 1 to 50 dilution (turbidimetric assays). When tested against *Rickettsiae prowazekii* growing in the embryo sac of the chick, this particular filtrate caused a prolongation in the mean death time of the chick embryo from 4.5 days to 5.1 days and a reduction in the number of positive smears in the untreated infected controls from six to zero in the treated infected embryos.

EXAMPLE 5

A nutrient medium is prepared by adding 9 g. of maltose, 4.5 g. of dried saline extracted hog stomach residue, 4.5 g. of corn-steep liquor solids and 4.5 g. of sodium chloride to 500 cc. of warm water, diluting the mixture with sufficient water to make 900 cc. and adjusting the pH to 7.5 to 7.7 with 10 N sodium hydroxide solution. The solution is divided into three parts and each portion placed in a one-liter wide-mouth Erlenmeyer flask. The flasks are capped with gauze-cotton milk filter discs held in place by spring clips and sterilized in an autoclave with steam at eighteen pounds pressure for twenty minutes. After cooling, the flasks are opened and the media inoculated with a spore suspension obtained by adding sterile water containing 0.01% castile soap to sporulating cultures of *Streptomyces griseus* (NRRL 2426) grown on a solid glucose-tryptone agar medium in sloping test tubes.

The flasks are capped and the media incubated for six days at 22 to 24° C. on a rotary-type shaking machine (150 r.p.m.; radius of circle 2 inches). From time to time small samples are removed from the flask and tested for antibiotic production by turbidimetric assay against *Micrococcus pyogenes* var. *aureus*. The following table shows the results of such assays on a typical experiment carried out as described above.

| Incubation period, days | pH of medium | Antibiotic activity against *Micrococcus pyogenes* var. *aureus* | |
|---|---|---|---|
| | | Percent inhibition | Dilution |
| 3 | 7.35 | 49 | 1-400 |
| 4 | 7.97 | 56 | 1-400 |
| 5 | 8.13 | 50 | 1-500 |
| 6 | 8.32 | 48 | 1-600 |

EXAMPLE 6

A mixture composed of 7.5 g. of corn-steep liquor solids, 15 g. of maltose, 22.5 g. of soybean oil meal, 7.5 g. of sodium chloride and sufficient water to make 1500 cc. is adjusted to pH 7.5 to 7.7 with 10 N sodium hydroxide solution. The unsterilized medium is divided into five equal portions and each portion placed in a one-liter wide-mouth Erlenmeyer flask and covered with milk filter pads held in place by spring clips. The flasks are placed in an autoclave and sterilized with steam at eighteen pounds pressure for twenty minutes.

After cooling, the flasks are opened and each of the sterile media inoculated with a spore suspension obtained by adding sterile water containing 0.01% castile soap to a sporulating culture of *Streptomyces griseus* (NRRL 2426) grown on a solid glucose-tryptone agar medium in a sloping test tube. The culture flasks are again capped with gauze-cotton milk filter discs and then placed on a rotary-type shaking machine. The cultures are incubated under aerobic conditions by swirling the flasks at 150 r.p.m. for six days. The temperature during the incubation is maintained at about 22 to 24° C. From time to time small samples are removed from the flasks and tested for antibiotic production by turbidimetric assay *Micrococcus pyogenes* var. *aureus*. The following table shows the results obtained on assay of a culture prepared and incubated as described above.

| Incubation period, days | pH of medium | Antibiotic activity against *Micrococcus pyogenes* var. *aureus* | |
|---|---|---|---|
| | | Percent inhibition | Dilution |
| 3 | 7.73 | 61 | 1- 400 |
| 4 | 8.27 | 55 | 1- 600 |
| 5 | 8.44 | 53 | 1-1000 |
| 6 | 8.28 | 42 | 1-1000 |

EXAMPLE 7

A mixture composed of 22.5 g. of soybean oil meal, 15 g. of starch, 7.5 g. of spirit mash, 7.5 g. of sodium chloride, 1.5 g. of calcium carbonate and sufficient water to make 1500 cc. is divided into five equal portions and each portion placed in a one-liter wide-mouth Erlenmeyer flask. The flasks are capped with gauze-cotton milk filter discs, placed in an autoclave and sterilized with steam at eighteen pounds' pressure for twenty minutes. After cooling, the caps are removed from the flasks and each medium is inoculated with a spore suspension obtained by adding sterile water containing 0.01% castile soap to a sporulating culture of *Streptomyces griseus* (NRRL 2426) grown on a solid glucose-tryptone agar medium in a sloping test tube.

The flasks are re-capped and the media incubated at 22 to 24° C. for six days while swirling on a rotary-type shaking machine at 150 r.p.m. From time to time small samples are withdrawn from the flasks and tested for antibiotic production by turbidimetric assay against *Micrococcus pyogenes* var. *aureus*. The following table shows the results obtained in a typical experiment using the above procedure.

| Incubation period, days | pH of medium | Antibiotic activity against *Micrococcus pyogenes* var. *aureus* ||
|---|---|---|---|
| | | Percent inhibition | Dilution |
| 3 | 7.08 | 52 | 1- 400 |
| 4 | 7.64 | 52 | 1- 600 |
| 5 | 7.83 | 48 | 1- 800 |
| 6 | 8.11 | 46 | 1-1000 |

EXAMPLE 8

A nutrient medium is prepared by adding 6 g. of corn-steep liquor solids, 30 g. of soybean oil meal, 20 g. of starch, 10 g. of sodium chloride and 2 g. of calcium carbonate to 1500 cc. of water and diluting the mixture to 2000 cc. The medium is divided into seven equal parts and each placed in a one-liter wide-mouth Erlenmeyer flask. The flasks are capped with gauze-cotton milk filter discs, placed in an autoclave and sterilized with steam at eighteen pounds pressure for twenty minutes.

After cooling, the sterile flasks are opened and the medium seeded with a spore suspension obtained by adding sterile water containing 0.01% castile soap to sporulating cultures of *Streptomyces griseus* (NRRL 2426) grown on a glucose-tryptone agar medium in sloping test tubes. The flasks are capped and the media incubated on a rotary-type shaking machine at 22 to 24° C. for six days by swirling them at the rate of 150 r.p.m. The extent of antibiotic production is measured from time to time by withdrawing small samples from the flasks and assaying them by the turbidimetric method against *Micrococcus pyogenes* var. *aureus*. The results obtained from one such run are indicated in the table below.

| Incubation period, days | pH of medium | Antibiotic activity against *Micrococcus pyogenes* var. *aureus* ||
|---|---|---|---|
| | | Percent inhibition | Dilution |
| 4 | 8.01 | 80 | 1- 400 |
| 5 | 8.82 | 49 | 1-2000 |
| 6 | 8.14 | 62 | 1-1000 |

EXAMPLE 9

A nutrient medium composed of 9 g. of corn-steep liquor solids, 30 g. of starch, 45 g. of soybean protein extract, 15 g. of sodium chloride, 3 g. of calcium carbonate and sufficient water to make 3000 cc. is divided into ten equal parts and each part placed in a one-liter wide-mouth Erlenmeyer flask. The flasks are capped with gauze-cotton milk filter discs, placed in an autoclave and sterilized with steam at eighteen pounds pressure for twenty minutes. After cooling, the flasks are opened and the sterile medium inoculated with spore suspensions obtained by adding sterile water containing 0.01% castile soap to sporulating cultures of *Streptomyces griseus* (NRRL 2426) on solid glucose-tryptone agar medium.

The inoculated media are incubated at 22 to 24° C. for six days on a rotary-type shaking machine revolved at the rate of 150 r.p.m. From time to time small samples are withdrawn from the flasks and assayed turbidimetrically for their antibiotic content against *Micrococcus pyogenes* var. *aureus*. In one such experiment the following results were obtained.

| Incubation period, days | pH of medium | Antibiotic activity against *Micrococcus pyogenes* var. *aureus* ||
|---|---|---|---|
| | | Percent inhibition | Dilution |
| 3 | 7.35 | 62 | 1- 400 |
| 4 | 7.91 | 54 | 1-1000 |
| 5 | 8.45 | 53 | 1-1000 |
| 6 | 8.32 | 40 | 1-1500 |

EXAMPLE 10

A mixture consisting of 6 g. of corn-steep liquor, 6 g. of maltose, 1.2 g. of dipotassium phosphate, 3 g. of sodium chloride and sufficient water to make 600 cc. is adjusted to pH 7.5 to 7.7 with 10 N sodium hydroxide. The solution is divided into two equal parts and each placed in a one-liter wide-mouth Erlenmeyer flask. The flasks are capped with gauze-cotton milk filter discs, placed in an autoclave and sterilized with steam under eighteen pounds pressure for twenty minutes. After cooling, the flasks are opened and the media inoculated with spore suspensions obtained by adding sterile water containing 0.1% castile soap to sporulating cultures of *Streptomyces griseus* (NRRL 2426) grown on glucose-tryptone agar media.

The flasks are capped and the inoculated media are incubated at 22 to 24° C. for four days on a rotary-type shaking machine revolved at the rate of 150 r.p.m. At the end of the incubation period antibiotic assay of a shaken culture filtrate prepared by this method showed 61% inhibition against *Shigella sonnei* at a dilution of 1 to 10 and less than 10% inhibition at a 1 to 50 dilution. Against *Micrococcus pyogenes* var. *aureus* this same filtrate showed an inhibition of 94% at a 1 to 10 dilution, a 71% inhibition at a 1 to 200 dilution and a 35% inhibition at a 1 to 400 dilution.

EXAMPLE 11

A nutrient medium is prepared by thoroughly mixing together 100 g. of wheat bran, 100 g. of wheat germ, 10 g. of trisodium phosphate, 5 g. of glucose, 2 g. of potassium chloride and 500 cc. of water. The medium is sterilized by heating it for 50 minutes at 105° C. in shallow pans. The sterilized solid medium is inoculated with a spore suspension obtained by adding sterile water to sporulating cultures of *Streptomyces griseus* (NRRL 2426) grown on a glucose-tryptone agar medium in sloping test tubes. The inoculated medium is incubated at 28° C. for six days and then the mixture extracted with water. The desired griseoviridin and viridogrisein which are present in the aqueous extract are then isolated by the procedures hereinbefore described.

EXAMPLE 12

A mixture consisting of 4 g. of beef extract, 4 g. of peptone, 4 g. of sodium chloride, 8 g. of maltose and sufficient water to make 800 cc. is adjusted to pH 7.5 with sodium hydroxide solution. The nutrient medium thus prepared is divided into portions and each placed in a one-liter flask so that the liquid has a depth of about 1 cm. when the flask is placed on its side. The medium is then sterilized by steam at eighteen pounds pressure for one hour, cooled and each medium inoculated with a spore suspension of *Streptomyces griseus* (NRRL 2426). The flasks are capped and the media incubated at 28° C. without disturbance for ten to twelve days. During the incubation period the *Streptomyces griseus* grows on the surface of the nutrient medium and the griseoviridin and viridogrisein produced dissolve in the liquid below the spore mat. After the incubation is completed, the spore mat is removed and the griseoviridin and viridogrisen isolated from the culture liquid by the methods described above.

EXAMPLE 13

In a 200-gallon steel fermenter coated internally with a phenol-formaldehyde compound, a mixture consisting of 12 lbs., 8 oz. of commercial glucose, 12 lbs., 8 oz. of hog stomach residue, 3 lbs., 12 oz. of yeast hydrolysate, 6 lbs., 4 oz. of sodium chloride and sufficient water to make 150 gallons is adjusted to pH 7.5 with 6 N sodium hydroxide solution and 1 lb., 4 oz. of precipitated calcium carbonate is then added. The medium is sterilized by steam at 15 lbs. pressure for one hour, cooled and inoculated with 10 gallons of a 27-hour vegetative seed culture of a strain of Streptomyces griseoviridus (NRRL 2427) prepared as described below, the mixture being incubated at 26° C. with aeration at 1.0 v.v.m. and agitated by stirring with a 12½-inch diameter, 3-blade disc impeller at 200 r.p.m. for 88 hours. During the incubation period at this stage, 1.75 gallons of an antifoaming agent comprising a mixture of crude lard and mineral oils containing mono- and diglycerides is added as necessary. The extent of antibiotic production is measured by withdrawing small samples from the fermenter and assaying them turbidimetrically against *Escherichia coli* and *Streptococcus hemolyticus*. The results obtained from one such run are indicated in the table below.

| Incubation Period, hours | pH of sample | Antibiotic activity against— | |
|---|---|---|---|
| | | E. coli (mcg. of griseoviridin std./cc.) | S. hemolyticus (mcg. of viridogrisein std./cc.) |
| 4 | 6.55 | <0.5 | <1.6 |
| 36 | 6.95 | 25 | 47 |
| 48 | 7.35 | 79 | 118 |
| 60 | 7.25 | 114 | 130 |
| 76 | 7.55 | 120 | 127 |
| 88 | 7.45 | 147 | 91 |

The inoculum used above is obtained in the following manner: In a 30-gallon stainless-steel seed fermenter a mixture composed of 378 g. of commercial glucose, 378 g. of hog stomach residue, 113 g. of yeast hydrolysate, 188 g. of sodium chloride, 50 cc. of the antifoaming agent referred to above and sufficient water to make 10 gallons is adjusted to pH 7.5 with 6 N sodium hydroxide solution and 37.8 g. of precipitated calcium carbonate is then added, the medium then being sterilized by steam at 15 lbs. pressure for one hour, cooled and inoculated with spores from two slants of a strain of *Streptomyces griseoviridus* (NRRL 2427), grown on Moyer's-sporulation-agar, suspended in 20 cc. of 0.01 percent sterile castile soap solution. The culture medium is next incubated at 26° C. for 27 hours, during which period sterile air is passed into the solution through a serrated inverted bowl at 2.6 v.v.m., agitation of the medium being accomplished by air-distribution.

EXAMPLE 14

In a 2000-gallon steel fermenter coated internally with a phenol-formaldehyde compound, a mixture consisting of 100 lbs. of commercial glucose, 100 lbs. of hog stomach residue, 30 lbs. of yeast hydrolysate, 50 lbs. of sodium chloride and sufficient water to make 1200 gallons is adjusted to pH 7.5 with 6 N sodium hydroxide solution and 10 lbs. of precipitated calcium carbonate is then added. The medium is sterilized by steam at 15 lbs. pressure for one hour, cooled and inoculated with 150 gallons of a 10-hour vegetative seed culture of a strain of *Streptomyces griseoviridus* (NRRL 2427), prepared as described below, the mixture being incubated at 26° C. with aeration at 0.5 to 1.0 v.v.m. and agitation by intermittent stirring with a 5-blade impeller at 110 to 125 r.p.m. for 81 hours. During the incubation period at this stage, 3.25 gallons of an antifoaming agent comprising a mixture of crude lard and mineral oils containing mono- and di-glycerides is added as necessary. The extent of antibiotic production is measured from time to time by withdrawing small samples from the fermenter and assaying them turbidimetrically against *Escherichia coli* and *Streptococcus hemolyticus*. The results obtained from one such run are indicated in the table below:

| Incubation Period, hours | pH of sample | Antibiotic activity against— | |
|---|---|---|---|
| | | E. coli (mcg. of griseoviridin std./cc.) | S. hemolyticus (mcg. of viridogrisein std./cc.) |
| 16 | 6.95 | | |
| 28 | 7.65 | 50 | 82 |
| 40 | 7.95 | 62 | 122 |
| 52 | 8.25 | 53 | 111 |
| 64 | 8.40 | 48 | 125 |
| 76 | 8.50 | 50 | 94 |

The inoculum used as above is obtained in the following manner: In a 200-gallon fermenter coated internally with a phenol-formaldehyde compound, a mixture composed of 12 lbs., 8 oz. of commercial glucose, 12 lbs., 8 oz. of hog stomach residue, 3 lbs., 12 oz. of yeast hydrolysate, 6 lbs., 4 oz of sodium chloride and sufficient water to make 150 gallons is adjusted to pH 7.5 with 6 N sodium hydroxide solution and 1 lb., 4 oz. of precipitated calcium carbonate is then added. The mixture is sterilized by steam at 15 lbs. pressure for one hour, cooled and inoculated with 10 gallons of a 24-hour vegetative seed culture of a strain of *Streptomyces griseoviridus* obtained as hereinafter described, the mixture being incubated at 26° C. with aeration at 1.0 v.v.m. and agitation by stirring with a 12½-inch diameter, 3-blade impeller at 200 r.p.m. for 10 hours. During the incubation period at this stage, 1.5 gallons of the antifoaming agent referred to above is added as necessary. The inoculum used in this run is in turn obtained according to the following procedure: A mixture composed of 378 g. of commercial glucose, 378 g. of hog stomach residue, 113 g. of yeast hydrolysate, 188 g. of sodium chloride, 50 cc. of the antifoaming agent referred to above and sufficient water to make 10 gallons is adjusted to pH 7.5 with 6 N sodium hydroxide and 37.8 g. of precipitated calcium carbonate is then added in a 30-gallon stainless-steel seed fermenter, and the medium is then sterilized by steam at 15 lbs. pressure for one hour, cooled and inoculated with spores from two slants of a strain of *Streptomyces griseoviridus* grown on Moyer's-sporulation-agar, suspended in 20 cc. of 0.01 percent sterile castile soap solution, the culture medium then being incubated at 26° C. for twenty-four hours, during which period sterile air is passed into the solution through a serrated inverted bowl at 2.5 v.v.m., agitation of the medium being accomplished by air-distribution.

We claim:

1. Process for obtaining griseoviridin and viridogrisein which comprises inoculating a sterile liquid, aqueous nutrient medium containing a proteinaceous material, minerals, and a source of assimilable carbon with *Streptomyces griseoviridus*, cultivating the said *Streptomyces griseoviridus* in contact with the nutrient medium under sterile aerobic conditions at a pH between about 6 and 9 and a temperature of about 20 to 40° C. for about two to fifteen days and separating therefrom the said antibiotics.

2. In a process for obtaining griseoviridin and viridogrisein, the step which comprises cultivating *Streptomyces*

*griseoviridus* in contact with a sterile nutrient medium containing a proteinaceous material, minerals, and a source of assimilable carbon under sterile aerobic conditions at a temperature of about 20 to 40° C. for about two to fifteen days.

3. Viridogrisein, a chemical compound containing by elemental analysis 58.94% carbon, 7.21% hydrogen, 12.73% nitrogen and 21.12% oxygen; being soluble in ethyl acetate, ethylene dichloride, methanol, ethanol, n-butanol, diethyl ether, and benzene and sparingly soluble in water and insoluble in petroleum ether; having an optical rotation $[\alpha]_D^{25}$ of $+59°$ at a concentration of 5% in chloroform and $+28°$ in a concentration of 5% in absolute ethanol; characterized by absorption maxima in the ultraviolet at about:

303 millimicrons in methanol,
304 millimicrons in diethyl ether,
350 millimicrons in water,
333 millimicrons in 0.1 normal sodium hydroxide solution, and
303 millimicrons in water, pH 1.16;

and exhibiting absorption maxima in the infrared at the following wave-lengths: 2.95, 3.28, 3.33, 5.71, 6.00 (shoulder), 6.10, 6.58, 6.80, 6.88, 7.08, 7.30 7.57, 7.73, 8.07, 8.32, 8.48, 8.87, 9.13 and 9.39 microns.

4. Process for obtaining griseoviridin and viridogrisein which comprises inoculating a sterile liquid, aqueous nutrient medium containing a proteinaceous material, minerals, and a source of assimilable carbon with a strain of *Streptomyces griseus* NRRL 2426, cultivating the said *Streptomyces griseus* in contact with the nutrient medium under sterile aerobic conditions in a submerged state at a pH between about 6 and 9 and at a temperature of about 20 to 40° C. for about two to fifteen days.

5. Process for obtaining griseoviridin and viridogrisein which comprises inoculating a sterile nutrient medium containing a proteinaceous material, minerals, and a source of carbohydrates with a microorganism strain of the group consisting of *Streptomyces griseus* NRRL 2426 and *Streptomyces griseoviridus* NRRL 2427, cultivating the said strain in contact with the inoculated nutrient medium under sterile aerobic conditions at a temperature of about 20 to 40° C. for about two to fifteen days and separating therefrom the said antibotics, said strain of *Streptomyces griseus* being capable of utilizing rhammose and *l*-arabinose when grown on synthetic agar.

6. Process for obtaining viridogrisein which comprises cultivating a microorganism of the group consisting of *Streptomyces griseus* NRRL 2426 and *Streptomyces viridogriseus* in contact with a sterile, liquid, aqueous nutrient medium containing proteinaceous materials, minerals and a source of assimilable carbon under sterile aerobic conditions at a temperature of about 20–40° C. for about 2 to 15 days and separating viridogrisein from said cultivated medium.

References Cited in the file of this patent

UNITED STATES PATENTS 2,449,866    Waksman _____ Sept. 21, 1948

OTHER REFERENCES

Sheehan: J.A.C.S., July 20, 1957, pages 3933–3934.
Journal of Bacteriology, vol. 72, No. 2, page 4.
Bartz et al.: Antibiotics Annual, 1954–1955, pp. 777–789, pub. 1955 by Med. Encyclopedia Inc.
Ames et al.: J. Chem. Soc., December 1955, pp. 4260–4269.